United States Patent
Fenn et al.

(10) Patent No.: US 6,719,297 B2
(45) Date of Patent: Apr. 13, 2004

(54) PISTON RING, IN PARTICULAR FOR A PISTON OF A VIBRATION DAMPER

(75) Inventors: Gerald Fenn, Pfersdorf (DE); Hassan Asadi, Schweinfert (DE); Matthias Höhn, Albertshofen (DE); Peter Wirth, Schonungen (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/940,191

(22) Filed: Aug. 27, 2001

(65) Prior Publication Data

US 2002/0043768 A1 Apr. 18, 2002

(30) Foreign Application Priority Data

Aug. 25, 2000 (DE) .......................................... 100 41 954

(51) Int. Cl.$^7$ ................................................. F16J 9/00
(52) U.S. Cl. ....................................... 277/434; 277/496
(58) Field of Search ........................... 277/435, 436, 277/437, 631, 496, 497, 498, 499

(56) References Cited

U.S. PATENT DOCUMENTS

| | | | | |
|---|---|---|---|---|
| 1,527,260 A | * | 2/1925 | Mc Millan | 277/631 |
| 1,563,262 A | * | 11/1925 | Davis | 277/496 |
| 2,415,594 A | * | 2/1947 | Jessup | 277/451 |
| 2,485,862 A | * | 10/1949 | Caza | 277/496 |
| 2,566,603 A | * | 9/1951 | Dykes | 277/447 |
| 2,670,257 A | * | 2/1954 | Bergeron | 277/496 |
| 2,719,767 A | * | 10/1955 | Ernest | 277/447 |
| 3,184,245 A | * | 5/1965 | Woolcott | 277/445 |
| 3,704,893 A | * | 12/1972 | Hill | 277/451 |
| 4,881,455 A | * | 11/1989 | Hirose | 92/248 |
| 5,149,109 A | * | 9/1992 | Jelinek et al. | 277/631 |
| 5,372,488 A | * | 12/1994 | Turner | 277/336 |
| 5,513,857 A | * | 5/1996 | Watanabe et al. | 277/469 |
| 5,611,260 A | * | 3/1997 | Kanari et al. | 92/248 |
| 5,615,756 A | | 4/1997 | Grundei et al. | 188/322.15 |
| 5,730,263 A | * | 3/1998 | Grundei et al. | 188/322.18 |
| 5,906,377 A | * | 5/1999 | Salameh | 277/632 |
| 6,003,227 A | | 12/1999 | Deppert et al. | 29/888.072 |
| 6,186,512 B1 | | 2/2001 | Deppert et al. | 277/434 |

FOREIGN PATENT DOCUMENTS

| | | | |
|---|---|---|---|
| GB | 2131121 A | * | 6/1984 |
| JP | 06-193505 | * | 7/1994 |

* cited by examiner

*Primary Examiner*—Anthony Knight
*Assistant Examiner*—André L. Jackson
(74) *Attorney, Agent, or Firm*—Cohen, Pontani, Lieberman & Pavane

(57) ABSTRACT

Piston ring including a covering surface which covers a circumferential surface of a piston, and supporting segments having retaining surfaces which engage the upper and lower sides of the piston. The piston ring has a butt joint which enables the piston ring to be elastically deformable radially, the butt joint being designed at one end of the covering surface with at least one tongue which engages in a cutout in the other end of the covering surface. The tongue is designed with at least one retaining segment which runs in the circumferential direction and engages in a supporting manner in each case on the upper and lower side of the piston.

19 Claims, 5 Drawing Sheets

PISTON RING, IN PARTICULAR FOR A PISTON OF A VIBRATION DAMPER

BACKGROUND OF THE INVENTION

1. Field of the Invention

The invention relates to a piston ring for use in a vibration damper (shock absorber), having a covering surface which covers a circumferential surface of a piston, and supporting surfaces with retaining segments which engage upper and lower sides of the piston. The piston ring has a butt joint formed by a tongue which is circumferentially movable in a cutout so that the piston ring can expand radially.

2. Description of the Related Art

U.S. Pat. No. 5,615,756 discloses a piston ring including a covering surface which covers a circumferential surface of a piston, and supporting segments having retaining surfaces which engage on the upper and lower sides of the piston. The piston ring has a butt joint which enables the piston ring to be elastically deformable radially, the butt joint being designed at one end of the covering surface with at least one tongue which engages in a cutout in the other end of the covering surface.

The design, which is simple in principle, and the problem-free installation are features of this piston ring. When piston rings are used in vibration dampers, it is possible, at very high damping forces, to detect relatively large dispersions of the damping forces which can be attributed to the piston ring. The tongue at one end of the piston ring tends to lift radially from the piston enabling a flow connection of undefined size between the upper and lower side of the piston to occur.

Under some circumstances, a remedy would be possible by using a radially effective clamping ring, as is disclosed, for example, U.S. Pat. No. 6,186,512. Either a groove or at least one shoulder is provided in the piston for the mounting of the clamping ring. Neither solution is suitable for a piston ring in conjunction with a flat piston, as is described in U.S. Pat. No. 5,615,756, since the production advantage described in that patent would no longer be usable.

SUMMARY OF THE INVENTION

The object of the present invention is to realize a piston ring, in particular for a flat piston, which is constantly leakproof even when subjected to a large hydraulic load.

According to the invention, the object is achieved by providing the tongue with at least one retaining segment which runs in the circumferential direction and engages in a supporting manner in each case on the upper and lower side of the piston.

The retaining segments not only prevent deformation of the tongue of the piston ring when subjected to pressure, but also ensure closure of the open butt joint.

In a further advantageous refinement of the invention, at least in some sections in the circumferential direction of the piston ring, the cutout is designed with bearing segments which fix the end of the piston ring axially with respect to the piston. Both ends of the piston ring are thereby defined in their position.

In order to be able to keep to a spatial refinement which is as simple as possible for the piston ring, the bearing segments are supported in the axial direction of the piston on the retaining segments.

The more uniformly the piston ring is able to keep to its circular shape, in particular in the region of the tongue, the better the sealing function is carried out. Therefore, the one end of the covering surface has, in the region of the butt joint, at least one centering web which aligns the tongue radially with respect to the cutout of the butt joint.

According to a further advantageous embodiment, the retaining segments are designed such that they are larger radially inward in relation to the piston ring than the bearing segments, so that the centering web engages, as part of the retaining segment, radially inward on the bearing segments. The centering web ensures that the tongue is not able to protrude radially from the circumferential surface of the piston ring. In practice, the centering web forms a locking means.

Furthermore, the piston ring can have at least one clamping ring which is arranged outside the circumferential surface of the piston and prestresses the piston ring against a cylindrical wall. The piston does not require any adaptation whatsoever for the clamping ring, so that a simple piston contour can be retained.

In this connection, the at least one clamping ring is accommodated in a groove, the supporting segment forming a groove side wall of the groove.

A second groove side wall is formed by a sealing lip of the piston ring. In the end, no additional axial construction space has to be used for the clamping ring.

In order to be able to optimally use the clamping action of the clamping ring, the groove width for the clamping ring is designed such that it is larger than the height of the clamping ring.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
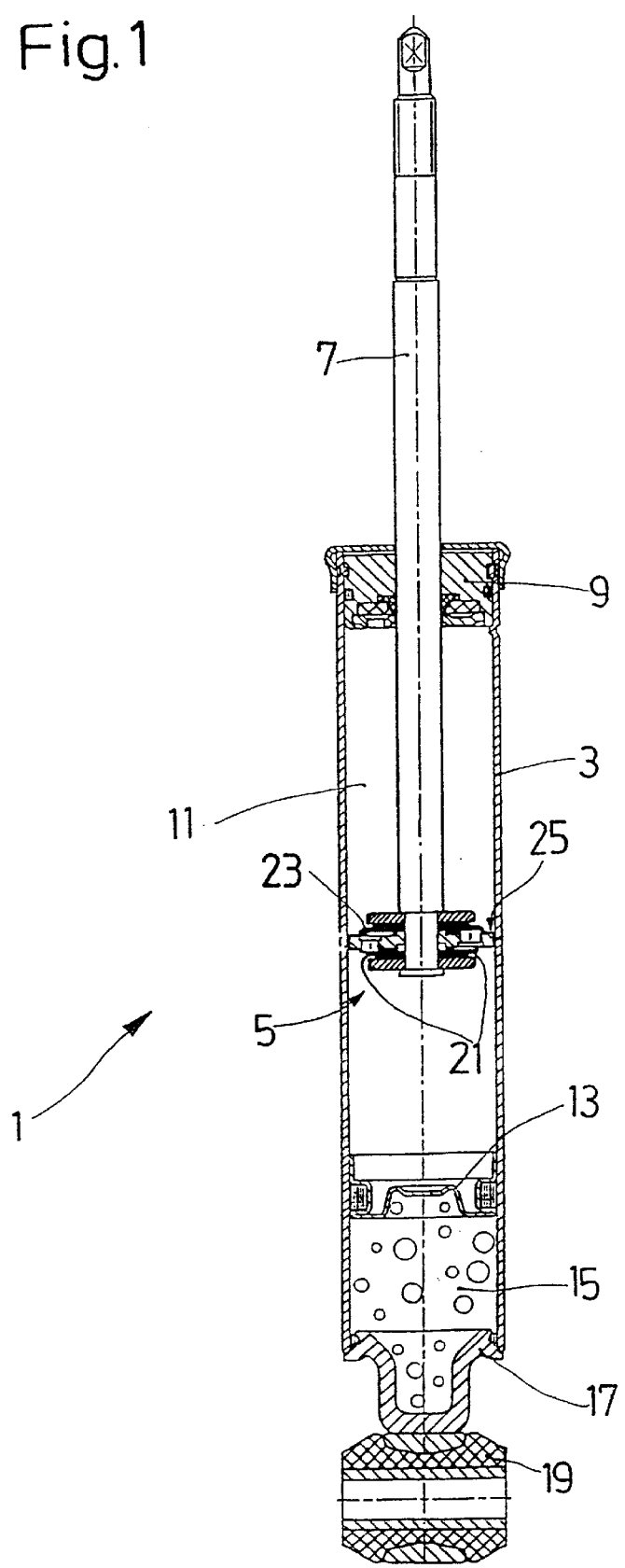
FIG. 1 is a cross-section of a vibration damper.

FIG. 1 shows, by way of example, a piston/cylinder unit 1 designed as a single-tube vibration damper. In principle, the invention can also be used in other piston/cylinder units.

The single-tube vibration damper 1 essentially comprises a pressure tube 3 in which a piston 5 is arranged in an axially movable manner on a piston rod 7. On the outlet side of the piston rod 7, a piston-rod guide 9 closes an operating space 11 which is filled with damping medium and is separated by a separating piston 13 from a gas space 15 having on its end side a base 17 with a boss 19.

During a piston-rod movement, damping medium is displaced through damping valves 21 in the piston 5, which valves are formed by valve disks 23. A piston ring 25 which covers a circumferential surface of the piston 5 prevents a lateral flow around the piston.

Figure 2:
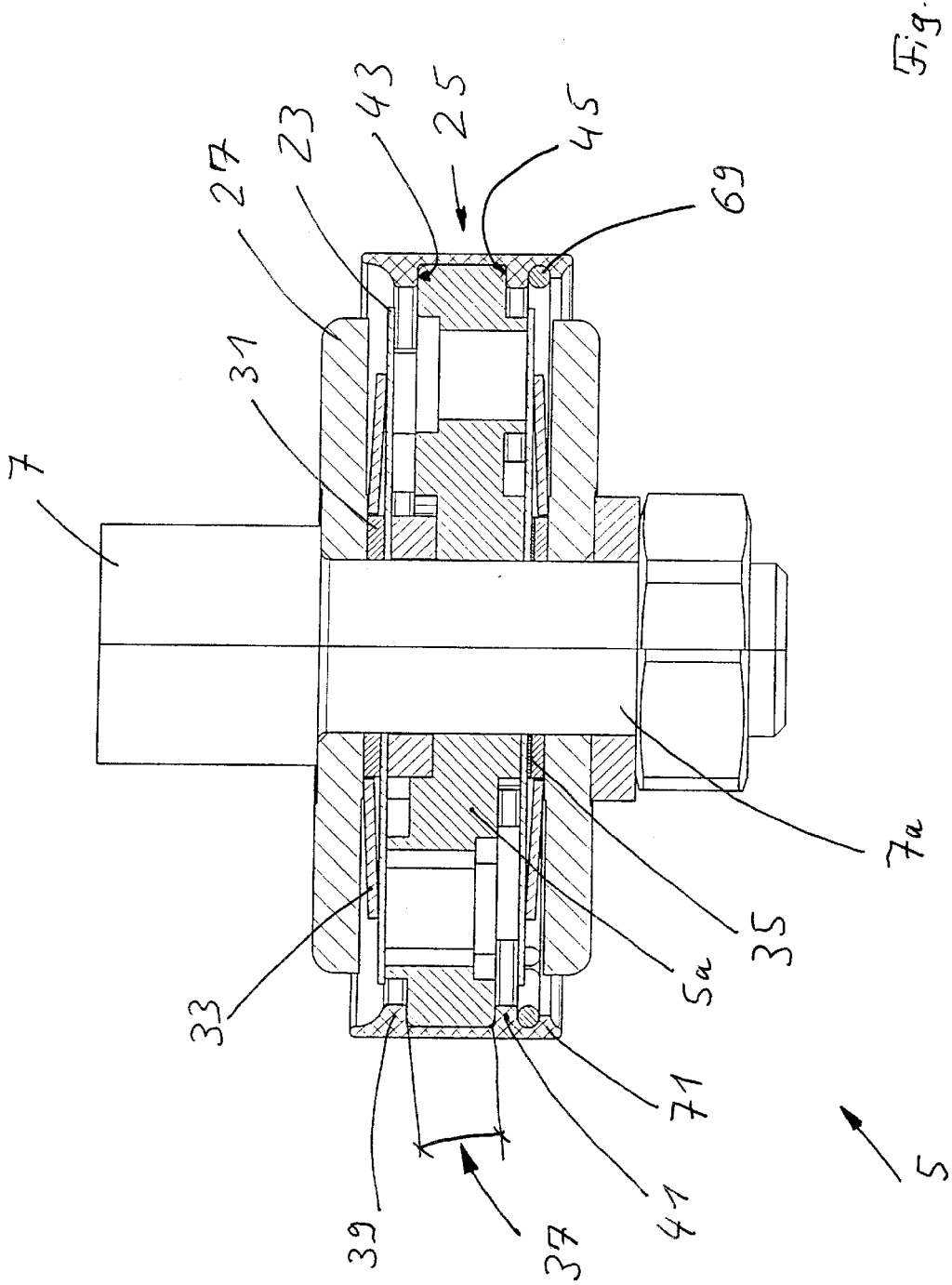
FIG. 2 is a cross-section of the piston as a subassembly.

FIG. 2 shows the piston 5 on the piston rod 7 with a supporting disk 27 and a centering sleeve 31. These components are all centered on a piston-rod journal 7a. The valve disk 23 and a cup spring 33 are centered in turn on the centering sleeve 31. A piston body 5a together with its piston ring 25 is centered in turn on the piston-rod journal 7a. A spring element 35 is placed onto the piston body. An undulated spring is particularly suitable as the spring element. The spring element has only a very low spring rate/spring force, since it only has to bear the centering sleeve 31 for this side of the piston. The height is dimensioned in such a manner that a covering is still present between the valve disk 23 and the centering sleeve. The cup spring 33 can also be aligned on the centering sleeve, in which case the centering sleeves of both sides of the piston should, if possible, be the same height.

If the piston is prestressed and closed, for example, with a piston nut 47, the supporting disk 27 is placed onto the piston body counter to the force of both cup springs 33. In this process, the spring force of the spring element 35 can be completely disregarded.

The piston ring 25 has a U-shaped cross section, so that supporting segments 39, 41 extending from the covering surface 37 of the piston ring engage with their retaining surfaces 43, 45 on the respective upper and lower sides of the piston body 5a and fix the piston ring 25 axially with respect to the piston 5.

Figure 3:
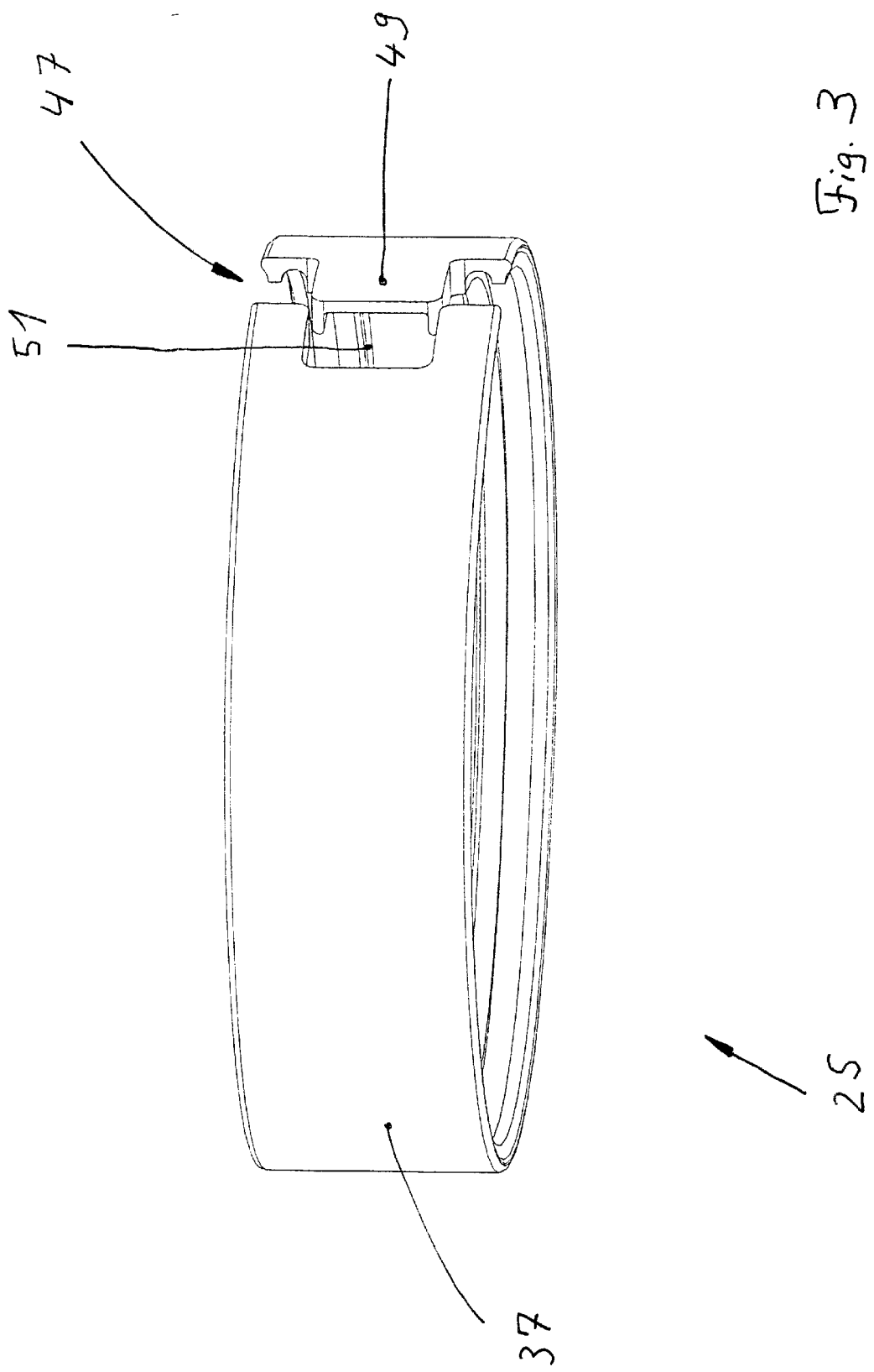
FIG. 3 is a perspective view of the piston ring as an individual part.

FIG. 3 shows the piston ring 25 as an individual part in a three-dimensional illustration. A butt joint 47 can be seen here which comprises a tongue 49 extending in the circumferential direction and a corresponding cutout 51, so that the piston ring can be extended radially for installation purposes.

Figure 4:
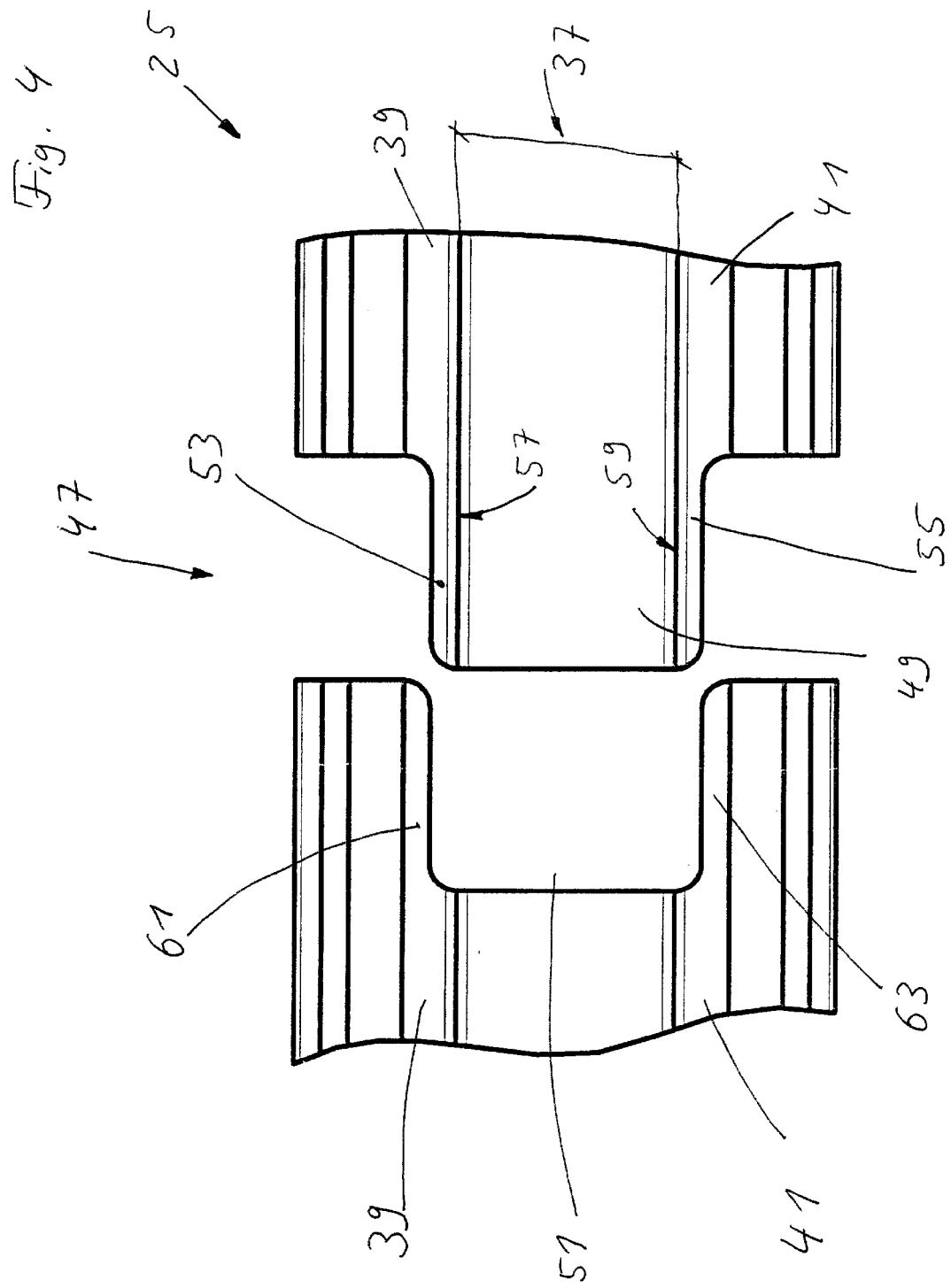
FIG. 4 is a partial view of the inside of piston the ring in the region of the butt joint.

FIG. 4 shows a view of the piston ring 25 from radially on the inside to radially on the outside. The supporting segments 39, 41 are formed on the opposed edges of the covering surface 37, which covers the circumferential surface of the piston. The supporting segments of the covering surface continue in the circumferential direction as retaining segments 53, 55 on the edge of the tongue 49. The retaining segments 53, 55 have, in a functionally identical manner to the supporting segments 39, 41, retaining surfaces 57, 59 which are supported on the upper and lower side of the piston. The tongue is thereby unambiguously defined in position in the axial direction of the piston.

Figure 5:
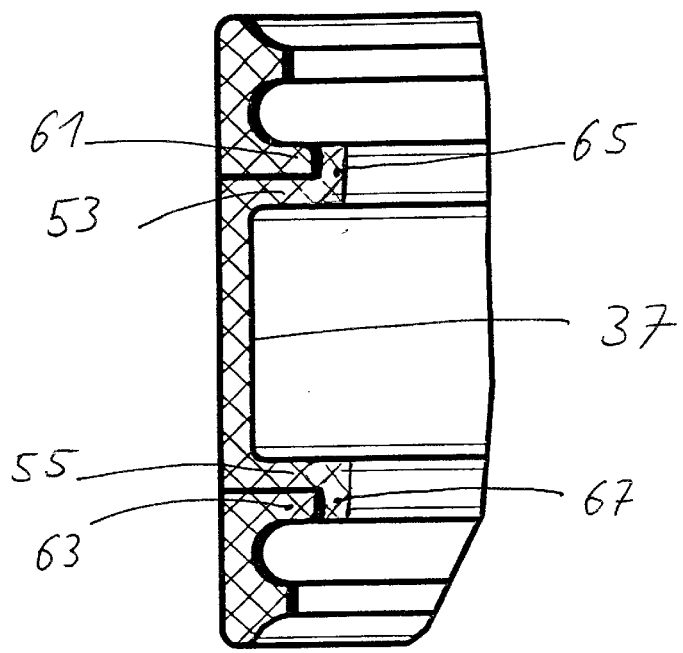
FIG. 5 is a section view through the piston ring in the region of the butt joint.

In order also to axially support the end of the piston ring 25 having the cutout 51, bearing segments 61, 63 which run in the circumferential direction are formed on the cutout and, when the butt joint is closed, the bearing segments are supported axially on the retaining segments 53, 55 of the tongue 49. This interrelationship is illustrated in FIG. 5 by a section through the butt joint. The bearing segments 61, 63 of the cutout, which merge into the supporting segments 39, 41, close an axially extending butt joint between the front end of the tongue 49 and the base of the cutout.

There is also the possibility of forming centering webs 65, 67 radially inward starting from the tongue on the retaining segments 53, 55, the centering webs engaging radially on the bearing segments 61, 63 and thereby preventing radial expansion of the tongue with respect to the cutout. If the centering webs are formed over the entire length of the tongue 49, then the largest part of an open butt joint running in the circumferential direction can also be closed.

Figure 6:
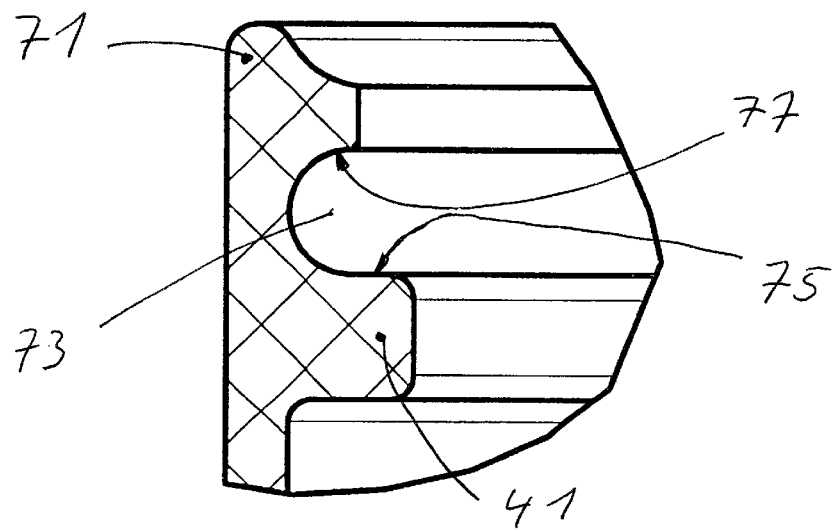
FIG. 6 is a detailed section view of the piston ring in the region of the groove for the clamping ring.

In FIG. 2, a clamping ring 69 can be seen which pretensions a sealing lip 71 of the piston ring 25 radially outward against a wall (not illustrated). FIG. 6 shows the piston ring in the region of a groove 73 in which the clamping ring 69 is accommodated. The clamping ring 71 clearly lies outside the circumferential surface of the piston, and so no structural measures whatsoever have to be undertaken on the piston for the clamping ring. A groove side wall 75 is formed by the supporting segment 41. The rear side of a sealing lip 71 forms a second groove side wall 77, the distance between the groove side walls 75, 79 being designed so that it is slightly larger than the diameter of the clamping ring, so that the clamping ring bears against the groove base in a secured manner.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston assembly for a vibration damper, said piston assembly comprising a piston and a piston ring, said piston comprising an upper side, a lower side, and a circumferential surface between said upper side and said lower side, said piston ring comprising
   a circumferentially extending radially inward facing covering surface covering said circumferential surface of said piston, said covering surface having opposed ends,
   a pair of parallel radially inward extending supporting segments on the radially inward facing covering surface of said piston ring, said supporting segments having respective axially facing retaining surfaces engaging respective said upper and lower sides of said piston,
   a tongue formed at one of said ends of said covering surface, said tongue having a pair of circumferentially and radially inward extending retaining segments which engage respective said upper and lower sides of said piston, and
   a cutout formed at the other of said ends of said covering surface, said tongue engaging in said cutout to form a butt joint.

2. A piston assembly as in claim 1 wherein said tongue is movable circumferentially in said cutout so that said piston ring can expand radially.

3. A piston assembly as in claim 1 wherein said tongue comprises at least one centering web which aligns the tongue radially with respect to the cutout.

4. A piston assembly as in claim 1 wherein said piston ring is formed with a pair of parallel bearing segments flanking said cutout, said bearing segments fixing said other end of said piston ring axially with respect to said piston.

5. A piston assembly as in claim 4 wherein said bearing segments are supported axially on respective said retaining segments.

6. A piston assembly as in claim 4 wherein said tongue comprises a pair of centering webs formed on respective said retaining segments, said centering webs engaging respective said bearing segments to align said tongue radially with respect to said cutout.

7. A piston assembly as in claim 1 further comprising a clamping ring arranged inside of said piston ring, said clamping ring prestressing said piston ring radially outward.

8. A piston assembly as in claim 7 wherein said piston ring comprises a groove flanked by one of said supporting segments, said groove accommodating said clamping ring.

9. A piston assembly as in claim 8 further comprising a sealing lip parallel to said supporting segments, said groove being flanked by one of said supporting segments and said sealing lip.

10. A piston assembly as in claim 9 wherein said groove has a width and said clamping ring has a height, said width being greater than said height.

11. A piston ring for fitting to a piston having an upper side, a lower side, and a circumferential surface therebetween, said piston ring comprising a circumferentially extending radially inward facing covering surface for covering said circumferential surface of said piston, said covering surface having opposed ends, a pair of parallel radially inward extending supporting segments on the radially inward facing covering surface of said piston ring, said supporting segments having respective axially facing retaining surfaces for engaging respective said upper and lower sides of said piston, a tongue formed at one of said ends of said covering surface, said tongue having a pair of radially inward extending retaining segments which engage respective said upper and lower sides of said piston, and a cutout formed at the other of said ends of said covering surface, said tongue engaging in said cutout to form a butt joint, said tongue being movable circumferentially in said cutout so that said piston ring can expand radially.

12. A piston ring as in claim 11 wherein said tongue comprises at least one centering web which aligns the tongue radially with respect to the cutout.

13. A piston ring as in claim 11 wherein said piston ring is formed with a pair of parallel bearing segments flanking said cutout, said bearing segments fixing said other end of said piston ring axially with respect to said piston.

14. A piston ring as in claim 13 wherein said bearing segments are supported axially on respective said retaining segments.

15. A piston ring as in claim 13 wherein said tongue comprises a pair of centering webs formed on respective said retaining segments, said centering webs engaging respective said bearing segments to align said tongue radially with respect to said cutout.

16. A piston ring as in claim 11 further comprising a clamping ring arranged inside of said piston ring, said clamping ring prestressing said piston ring radially outward.

17. A piston ring as in claim 16 wherein said piston ring comprises a groove flanked by one of said supporting segments, said groove accommodating said clamping ring.

18. A piston ring as in claim 17 further comprising a sealing lip parallel to said supporting segments, said groove being flanked by one of said supporting segments and said sealing lip.

19. A piston ring as in claim 18 wherein said groove has a width and said clamping ring has a height, said width being greater than said height.

* * * * *